United States Patent [19]

Demeulemeester et al.

[11] Patent Number: 4,832,963

[45] Date of Patent: May 23, 1989

[54] METHOD OF TREATING FRUITS AND VEGETABLES FOR MARKETING

[76] Inventors: Jean-Robert Demeulemeester, Les Balmes, 01600 Reyrieux; Jean-Marc Demeulemeester, Saint-Sorlin, both of 01600 Reyrieux, France

[21] Appl. No.: 140,004

[22] Filed: Dec. 31, 1987

[51] Int. Cl.$^4$ ............................................. C12H 1/00
[52] U.S. Cl. ......................................... 426/8; 426/49; 426/615; 426/521; 426/407; 426/412
[58] Field of Search ............... 426/849, 520, 521, 407, 426/410, 412, 392, 615

[56] References Cited

U.S. PATENT DOCUMENTS 4,505,937  3/1985  Demeulemeester et al. ........... 426/8

*Primary Examiner*—Marianne Cintins
*Attorney, Agent, or Firm*—Herbert Dubno; Jonathan Myers

[57] ABSTRACT

A method of preparing vegetables for marketing which involves the steps of:
(a) vacuum conditioning of the comestible in its raw state in plastic pouches, i.e. a vacuum packing thereof;
(b) a first pasteurization at a temperature ranging from above 85° C. and up to 95° C.;
(c) a bacterial development or incubation treatment for a period of 24 to 27 hours at a temperature comprised between 25° and 30° C.;
(d) a second pasteurization for 20 to 40 minutes at a temperature comprised between 85° and 93° C.; and
(e) refrigeration of the packaged product.

The method is especially applicable to fruits and vegetables which are sensitive to heat and, particularly, onions, leeks, garlic, shallots and the like.

4 Claims, 1 Drawing Sheet

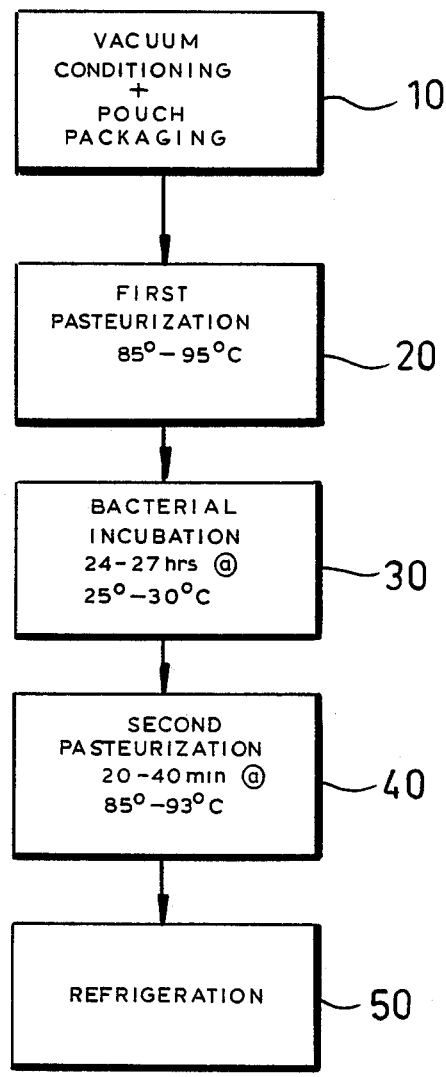

METHOD OF TREATING FRUITS AND VEGETABLES FOR MARKETING

FIELD OF THE INVENTION

Our present invention relates to a method of treating fruits and vegetables, hereinafter referred to as comestibles, to prepare them for marketing, i.e. for sale, distribution and display, so that the comestible product will be preserved for long periods of time in a form free from spoilage and yet will have a texture and appearance which facilitates use and can resemble the texture and appearance of the raw product.

BACKGROUND OF THE INVENTION

In our U.S. Pat. No. 4,505,937 issued 19 March 1985 and based upon a French application filed 19 May 1981 and issued as French patent FR No. 2,506,127, we have described a process for the treatment of vegetables, especially potatoes, for marketing. The potatoes are subjected to selection, peeling and, if desired, cutting up into pieces and the resulting product is then treated in five successive stages in the following order:

(a) a light pasteurization effected at a temperature between substantially 75° and 85° C.;

(b) vacuum conditioning in plastic pouches, corresponding essentially to a vacuum packaging in the plastic pouches;

(c) a treatment resulting in the development of bacteria in the spore state and present in the potatoes in order to improve the vegetative condition thereof, i.e. incubation of bacteria, by subjecting the closed pouches containing the potato to a temperature of 25° to 35° C. in a treatment vessel;

(d) pasteurization at a temperature between 85° and 90° C.; and (e) refrigeration or cooling.

Full details of the process can be found in the above-mentioned U.S. patent.

While this process has been found to be highly effective for potatoes and is also effective for other tubers, the number of vegetables with which it can be used is limited to those which can be subjected without danger to the pasteurization which constitutes the first phase (step (a)) of this process.

We have found that there are certain vegetables which do not tolerate well the initial pasteurization step. These include onions, leeks, garlic, shallots and like vegetables. Most fruits also do not tolerate the initial pasteurization well.

OBJECTS OF THE INVENTION

It is, therefore, the principal object of this invention to provide an improved method of treating fruits and vegetables, especially fruits and vegetables which are not amenable to treatment by the aforedescribed prior art method, for marketing and distribution without the above-mentioned drawbacks. Another object of the invention is to provide a second method which is not only applicable to vegetables but can be used as well for fruits and like heat-sensitive comestibles.

SUMMARY OF THE INVENTION

These objects and others which will become apparent hereinafter are attained, in accordance with the invention which represents a modification of the process described in the aforementioned patents in a number of respects with reference to parameters of the process used but most markedly by an inverting of the two first phases or steps of the treatment. It can also involve a significant increase in the temperature of the first pasteurization step.

In other words with the invention, the raw comestible is subjected to a vacuum conditioning and packaging in plastic pouches before the first pasteurization. It is indeed surprising that in this manner it is possible to eliminate the drawbacks of the earlier technique insofar as they apply to certain vegetables and to fruits so that the method of the invention is applicable to the onions, leeks, garlic and shallots mentioned previously as well as to other vegetables and to fruits which could not be treated by the system of the above-mentioned patents.

The invention thus comprises treating the comestibles after selection, peeling and, if desired, cutting into pieces, by the five successive stages in order:

(a) vacuum conditioning of the comestible in its raw state in plastic pouches, i.e. a vacuum packing thereof;

(b) a first pasteurization at a temperature ranging from above 85° C. and up to 95° C.;

(c) a bacterial development or incubation treatment for a period of 24 to 27 hours at a temperature comprised between 25° and 30° C.;

(d) a second pasteurization for 20 to 40 minutes at a temperature comprised between 85° and 93° C.; and (e) refrigeration of the packaged product.

BRIEF DESCRIPTION OF THE DRAWING

The above and other objects, features and advantages of the present invention will become more readily apparent from the following description, reference being made to the accompanying drawing, the sole FIGURE of which is a diagram illustrating the successive steps of the process.

SPECIFIC DESCRIPTION

Following selection of the fruits and vegetables to be packaged and peeling of them and, if desired, cutting of the fruit or vegetable into pieces, and without prior heat treatment, the comestible is introduced into a serving-size pouch and is subjected to a vacuum in the pouch for a period of which is not crucial but can be between 1 minute and 15 minutes at a temperature ranging from room temperature to say 60° C., whereupon the pouch is sealed under vacuum.

This step is represented at 10.

The comestible sealed in the pouch is then subjected to the first or slight pasteurization as represented at 20 as described in the above-mentioned U.S. patent, e.g. for a period of 5 to 15 minutes but at a temperature upwards of 85° to 95° C. utilizing a continuous process in which the pouches are moved through the pasteurizer or a batch process.

The bacterial incubation step represented at 20 can be carried out for 24 to 27 hours at 25° and about 24 hours at the higher temperature of about 30° C. The incubation step can be carried out in the manner described in U.S. Pat. No. 4,505,937. The result is a development of spores and bacteria into a vegetative state.

Then the second pasteurization is carried out as described in this last-mentioned patent for a period of 20 to 40 minutes at a temperature of 85° to 93° C. and the product is refrigerated, e.g. for a period of 3 to 12 hours at 5° to 10° C. as represented in stage 50. The second pasteurization stage has been indicated at 40.

SPECIFIC EXAMPLE

Leeks, garlic, onions and shallots are selected to be free from bruised vegetables and then are peeled and introduced whole, i.e. without cutting but in a raw state into plastic pouches. They are subjected to a vacuum of $10^{-3}$ mmHg for a period of about 10 minutes, whereupon the individual pouches containing the separate vegetables are ultrasonically sealed.

The pouches were sized to contain about 500 grams of the comestible each.

The pouches are then subjected to a first pasteurization at 90° C. for 10 minutes utilizing a continuous pasteurization in the manner described in U.S. Pat. No. 4,505,937. The pouches are cooled with water and brought to an incubation temperature of about 29° C. at which they are held for 25 hours.

The pouches are then subjected to a second pasteurization for 30 minutes at 93° C. and refrigerated for 10 hours at 5° C.

Throughout the process, the appearance of the product is viewed through the transparent pouches remained unchanged and after long-term storage, no visible change was apparent. The products had the texture and characteristics of the raw vegetables.

The process was also carried out with apricots and peaches which, after peeling, were cut and freed from the respective pits, with similar effect.

We claim:

1. A method of preparing a comestible product which is a heat-sensitive fruit or a heat-sensitive vegetable, comprising the successive steps of:
   (a) selecting and peeling the comestible product to form pieces of a raw comestible;
   (b) thereafter without treating the raw comestible with heat, introducing the raw comestible into plastic pouches and vacum-packing the raw comestible in said pouches;
   (c) following step (b) subjecting the comestible in said pouches to a first pasteurization at a temperature ranging from above 85° C. to 95° C.;
   (c) after the first pasteurization in step (c), incubating the comestible in said pouches for a period of 24 to 27 hours at a temperature between 25° to 30° C. to permit the growth of selected spores and bacteria which have survived the pasteurization during step (c);
   (e) thereafter subjecting the comestible in said pouches to a second pasteurization for 20 to 40 minutes at a temperature between 85° C. and 93° C.; and
   (f) thereafter refrigerating the comestible-containing pouches, whereby a comestible product having the texture and appearance of the raw comestible product is obtained.

2. The method defined in claim 1 wherein step (c) is carried out for a period of 5 to 15 minutes.

3. The method defined in claim 1 wherein the vegetable is selected from the group which consists of onions, leeks, garlic, and shallots.

4. A method of preparing a comestible product which is a heat-sensitive vegetable selected from the group consisting of onions, leaks, garlic, and shallots, comprising the successive steps of:
   (a) selecting and peeling the comestible product to form pieces of a raw comestible;
   (b) thereafter without treating the raw comestible with heat, introducing the raw comestible into plastic pouches and vacuum-packing the raw comestible in said pouches;
   (c) following step (b) subjecting the comestible in said pouches to a first pasteurization at a temperature of 90° C.;
   (d) after the first pasteurization in step (c), incubating the comestible in said pouches for a period of 24 to 27 hours at a temperature between 25° to 30° C. to permit the growth of selected spores and bacteria which have survived the pasteurization during step (c);
   (e) thereafter subjecting the comestible in said pouches to a second pasteurization for 20 to 40 minutes at a temperature of 93° C.; and
   (f) thereafter refrigerating the comestible-containing pouches, whereby a comestible product having the texture and appearance of the raw comestible product is obtained.

* * * * *